United States Patent
Diop et al.

(10) Patent No.: US 12,401,183 B2
(45) Date of Patent: Aug. 26, 2025

(54) SINGLE PERSON WEDGE CLAMP

(71) Applicant: Hubbell Incorporated, Shelton, CT (US)

(72) Inventors: Seydou Diop, Hoover, AL (US); Adrian Beau Candelaria, Montevallo, AL (US); Joshua Chapman Carter, Birmingham, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 18/007,980

(22) PCT Filed: Jun. 3, 2021

(86) PCT No.: PCT/US2021/035670
§ 371 (c)(1),
(2) Date: Dec. 2, 2022

(87) PCT Pub. No.: WO2021/247839
PCT Pub. Date: Dec. 9, 2021

(65) Prior Publication Data
US 2023/0238789 A1    Jul. 27, 2023

Related U.S. Application Data

(60) Provisional application No. 63/034,531, filed on Jun. 4, 2020.

(51) Int. Cl.
*H02G 7/05* (2006.01)

(52) U.S. Cl.
CPC .................. *H02G 7/056* (2013.01)

(58) Field of Classification Search
CPC .. H02G 1/00; H02G 7/05; H02G 1/04; H02G 7/00; H02G 1/02; H02G 7/056; H02G 7/02; H02G 7/053
(Continued)

(56) References Cited

U.S. PATENT DOCUMENTS

| 482,975 | A | * | 9/1892 | Cope | F16G 11/04 |
| | | | | | 54/33 |
| 1,415,112 | A | * | 5/1922 | Perlitz | H02G 7/056 |
| | | | | | 24/135 R |

(Continued)

FOREIGN PATENT DOCUMENTS

| CA | 2768281 A1 * | 8/2012 | H02G 7/02 |
| CN | 118610975 A * | 9/2024 | H02G 7/056 |

(Continued)

OTHER PUBLICATIONS

Machine Translation of JP-4484401 (Year: 2010).*

(Continued)

*Primary Examiner* — Taylor Morris
(74) *Attorney, Agent, or Firm* — Robinson + Cole LLP

(57) ABSTRACT

A dead-end clamp assembly for a utility conductor includes a clamp body having a base with a front end and a rear end, a first jaw guide extending from the base, and a second jaw guide extending from the base. The base, first jaw guide, and second jaw guide at least partially define a trough. A first jaw movably engages the body and a second jaw movably engages the body. The first jaw engages the second jaw such that the first and second jaws move together. A sag eye extends from the clamp body. The sag eye has an opening configured to receive a hotstick. A clevis connector extends from the rear end of the clamp body. The clevis connector is configured to receive a clevis pin so that the clevis pin is positioned below the trough.

22 Claims, 12 Drawing Sheets

(58) Field of Classification Search
USPC .......................................................... 248/63
See application file for complete search history.

(56) References Cited

U.S. PATENT DOCUMENTS

| | | | | |
|---|---|---|---|---|
| 1,973,502 A * | 9/1934 | Olson | ................... | H02G 7/053 24/136 R |
| 2,137,858 A * | 11/1938 | Schwabacher | ......... | H02G 7/056 174/161 R |
| 2,274,055 A * | 2/1942 | Fitzpatrick | ............. | H02G 7/056 403/80 |
| 2,775,422 A * | 12/1956 | Von Herbulis | ......... | H02G 7/053 24/135 R |
| 3,108,344 A * | 10/1963 | Barron | .................... | H02G 7/056 403/373 |
| 3,284,863 A * | 11/1966 | Lindsey | ................. | H02G 7/056 174/79 |
| 3,470,528 A * | 9/1969 | Flynn | .................... | H02G 7/056 24/115 R |
| 4,183,686 A * | 1/1980 | De France | ............. | F16G 11/06 24/135 K |
| 4,383,668 A | 5/1983 | Hall | | |
| 4,407,471 A * | 10/1983 | Wilmsmann | ........... | H02G 7/056 294/102.1 |
| 4,428,100 A * | 1/1984 | Apperson | .............. | H02G 7/056 24/115 M |
| 4,523,355 A * | 6/1985 | Rosa | ...................... | H01B 17/06 403/209 |
| 4,592,117 A * | 6/1986 | Ruehl | ...................... | H02G 7/08 24/132 WL |
| 4,719,672 A * | 1/1988 | Apperson | ................ | G02B 6/48 24/135 R |
| 5,539,961 A * | 7/1996 | DeFrance | .............. | H02G 7/056 403/314 |
| 5,581,051 A * | 12/1996 | Hill | ........................ | H01H 31/00 174/138 R |
| 5,752,680 A | 5/1998 | Mann | | |
| 6,076,236 A | 6/2000 | DeFrance | | |
| 6,282,759 B1 * | 9/2001 | Czaloun | ................ | F16G 11/048 24/132 R |
| 6,547,481 B2 * | 4/2003 | Grabenstetter | ........ | H02G 7/056 294/102.1 |
| 6,796,854 B2 * | 9/2004 | Mello | ................... | H01R 4/5083 439/796 |
| 7,039,988 B2 * | 5/2006 | De France | ............. | H02G 7/056 439/783 |
| 7,562,848 B2 * | 7/2009 | Tamm | .................... | H02G 7/056 24/67.5 |
| 8,991,790 B2 * | 3/2015 | Herman | .................. | H02G 1/02 254/134.3 R |
| 9,825,449 B2 * | 11/2017 | Diop | ....................... | F16B 2/065 |
| 11,322,918 B2 * | 5/2022 | Schenk | .................... | H02G 1/02 |
| 2002/0106239 A1 | 8/2002 | Grabenstetter et al. | | |
| 2013/0240685 A1 * | 9/2013 | Bundren | ................ | F16L 3/1033 248/74.1 |
| 2015/0200527 A1 | 7/2015 | Shibilia et al. | | |
| 2018/0375315 A1 * | 12/2018 | Park | ....................... | H02G 7/053 |
| 2019/0157850 A1 * | 5/2019 | Herman | .................. | H02G 1/04 |
| 2020/0251833 A1 * | 8/2020 | Schumann | ............... | H02G 7/05 |

FOREIGN PATENT DOCUMENTS

| | | | | | |
|---|---|---|---|---|---|
| GB | | 297159 A | * | 9/1928 | ............ H02G 7/056 |
| JP | | H02307321 A | * | 12/1990 | |
| JP | | 4484401 B2 | * | 6/2010 | ............ H02G 7/053 |
| KR | | 890008378 Y1 | * | 11/1989 | ............ H02G 7/056 |
| KR | | 200405444 Y1 | * | 1/2006 | ............... F16B 2/14 |
| KR | | 20150115426 A | | 10/2015 | |
| WO | WO-2013130346 A2 | | * | 9/2013 | ............. F16B 2/065 |

OTHER PUBLICATIONS

Machine Translation of JP H02307321 (Year: 1990).*
International Search Report and Written Opinion mailed in Application No. PCT/US2021/035670, dated Sep. 17, 2021.

* cited by examiner

SINGLE PERSON WEDGE CLAMP

FIELD

Various exemplary embodiments relate to a dead-end clamp or tension device for attaching a utility line cable to a support.

BACKGROUND

Dead-ends are couplings used to anchor electrical transmission lines to supporting structures such as towers or poles. Typically a dead-end connects the power line to an insulated mount attached to the supporting structure. Dead-ends include a mechanism for gripping the conductor of the power line so that the tension on the line is delivered through the insulated mount to the supporting structure. Dead-ends are characterized by robust construction from high strength materials to withstand the tension on power line, which may exceed several thousand pounds of force.

Weather events, such as wind and ice may place an additional strain on a transmission lines and cause downed lines or other part failures. In certain situations, a dead-end may need to be replaced or installed during extreme weather events. This can be difficult given the environmental circumstances and the presence of live power wires. Dead-ends typically need to be installed by more than one person, which can limit response time in emergency situations. Accordingly, there remains a need for a dead-end connector that can be safely installed by a single person in the presence of live power lines.

SUMMARY

According to various aspects, a dead-end clamp assembly for a utility conductor includes a clamp body having a base with a front end and a rear end, a first jaw guide extending from the base, and a second jaw guide extending from the base. The base, first jaw guide, and second jaw guide at least partially define a trough. A first jaw movably engages the body and a second jaw movably engages the body. The first jaw engages the second jaw such that the first and second jaws move together. A sag eye extends from the clamp body. The sag eye has an opening configured to receive a hotstick. A clevis connector extends from the rear end of the clamp body. The clevis connector is configured to receive a clevis pin so that the clevis pin is positioned below the trough.

According to various aspects, a dead-end clamp assembly for a utility conductor includes a clamp body having a base with a front end and a rear end, a first jaw guide extending from the base, and a second jaw guide extending from the base. The base, first jaw guide, and the second jaw guide at least partially define a trough. A first jaw movably engages the body and a second jaw movably engages the body. The first jaw engages the second jaw such that the first and second jaws move together. A sag eye extends from the clamp body beneath the base opposite the trough. The sag eye has an opening configured to receive a hotstick and oriented to allow a connected hotstick to be positioned beneath the base. A clevis connector extends from the rear end of the clamp body.

According to various aspects, a method of installing a dead-end clamp assembly on a utility conductor includes positioning a clamp assembly including a clamp body, a first jaw, a second jaw, a sag eye, and a clevis connector. A hotstick is connected to the sag eye. The clamp assembly is moved with the hotstick, to receive a conductor. The first jaw and second jaw are engaged with the conductor. Moving the clamp assembly to receive the conductor and engaging the first jaw and second jaw are performed using a single hotstick without requiring disengagement of the hotstick from the sag eye.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
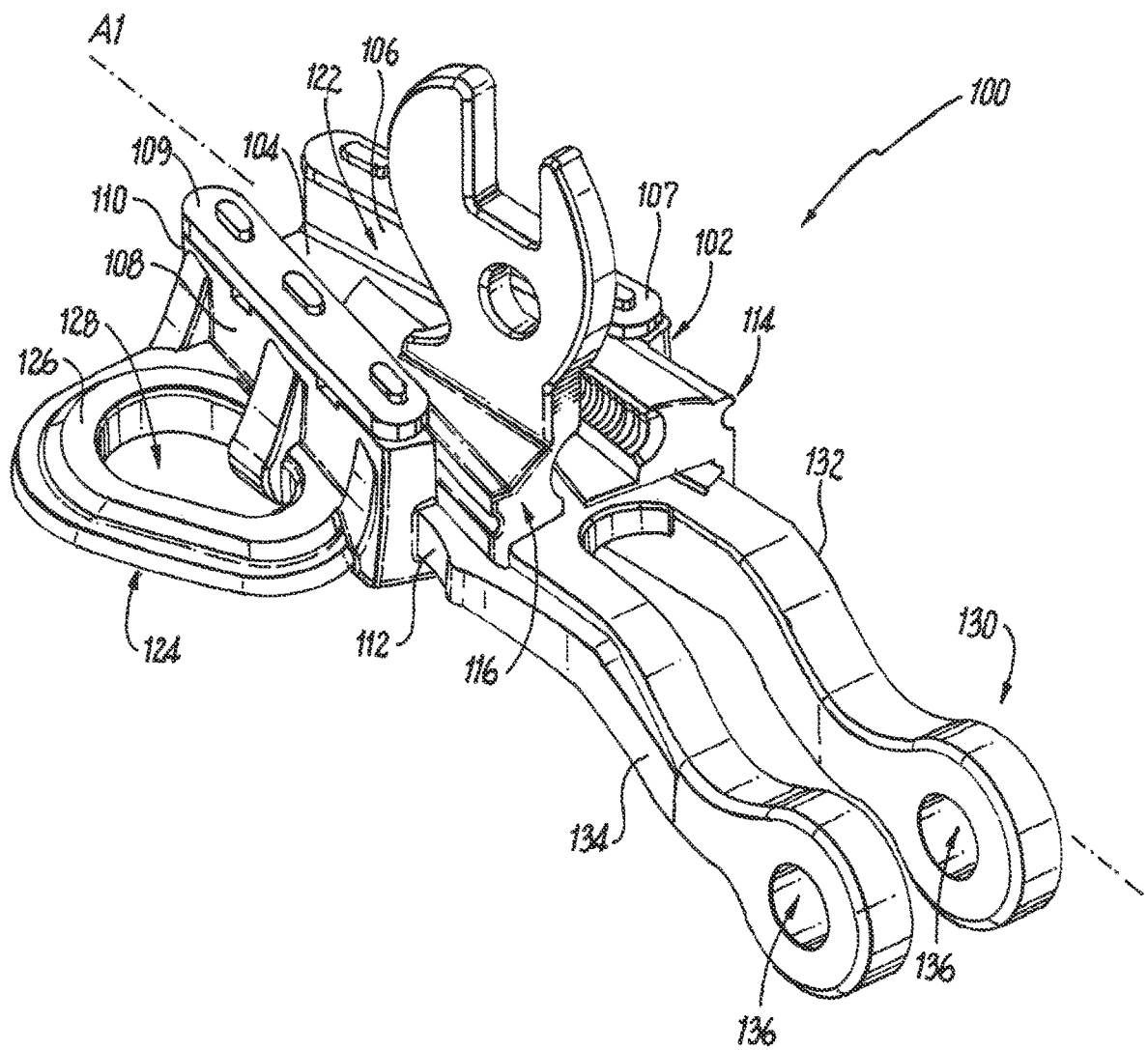
FIG. 1 is a perspective view of an exemplary clamp assembly.
Figure 2:
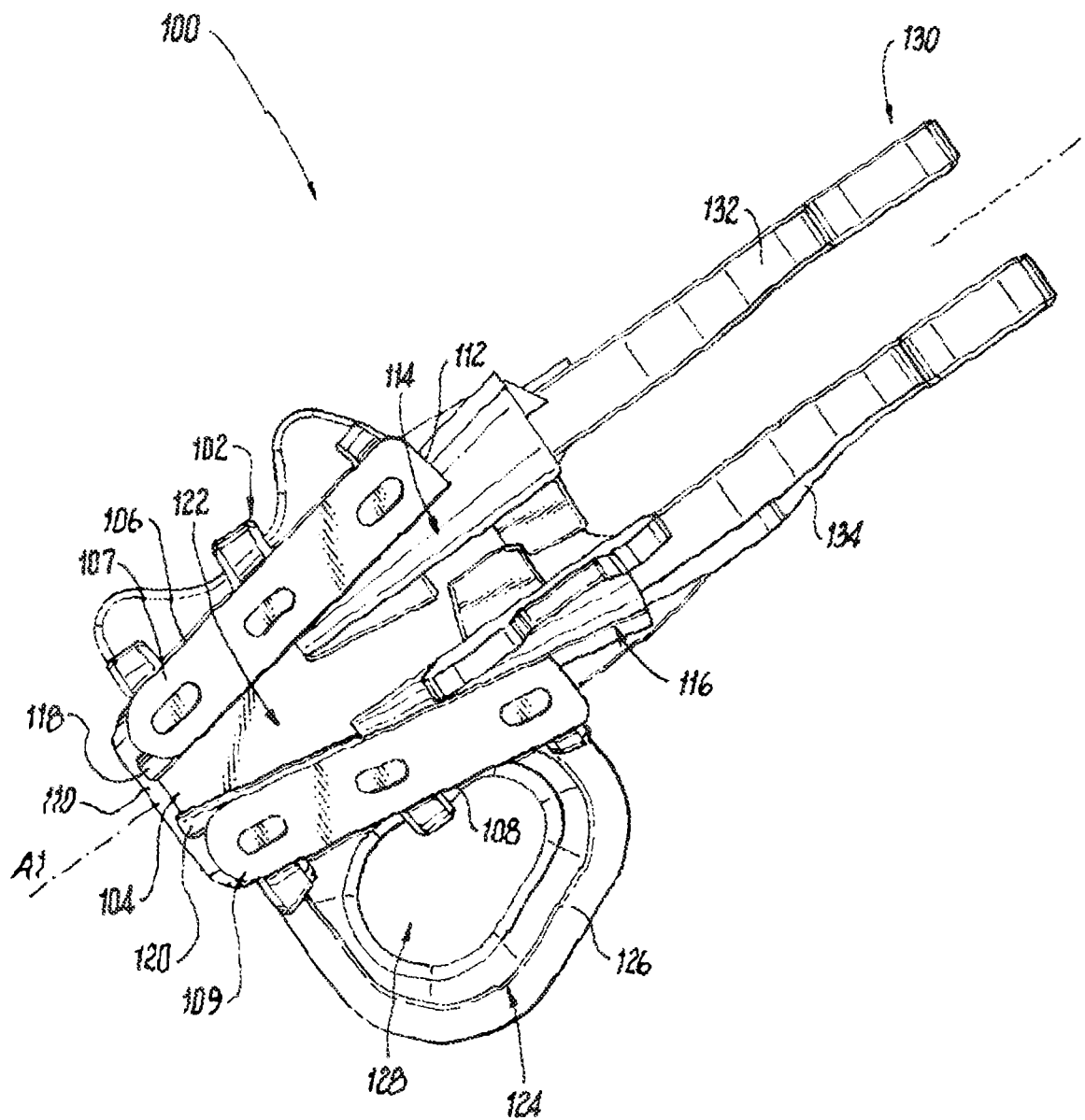
FIG. 2 is a top, perspective view of FIG. 1.
Figure 3:
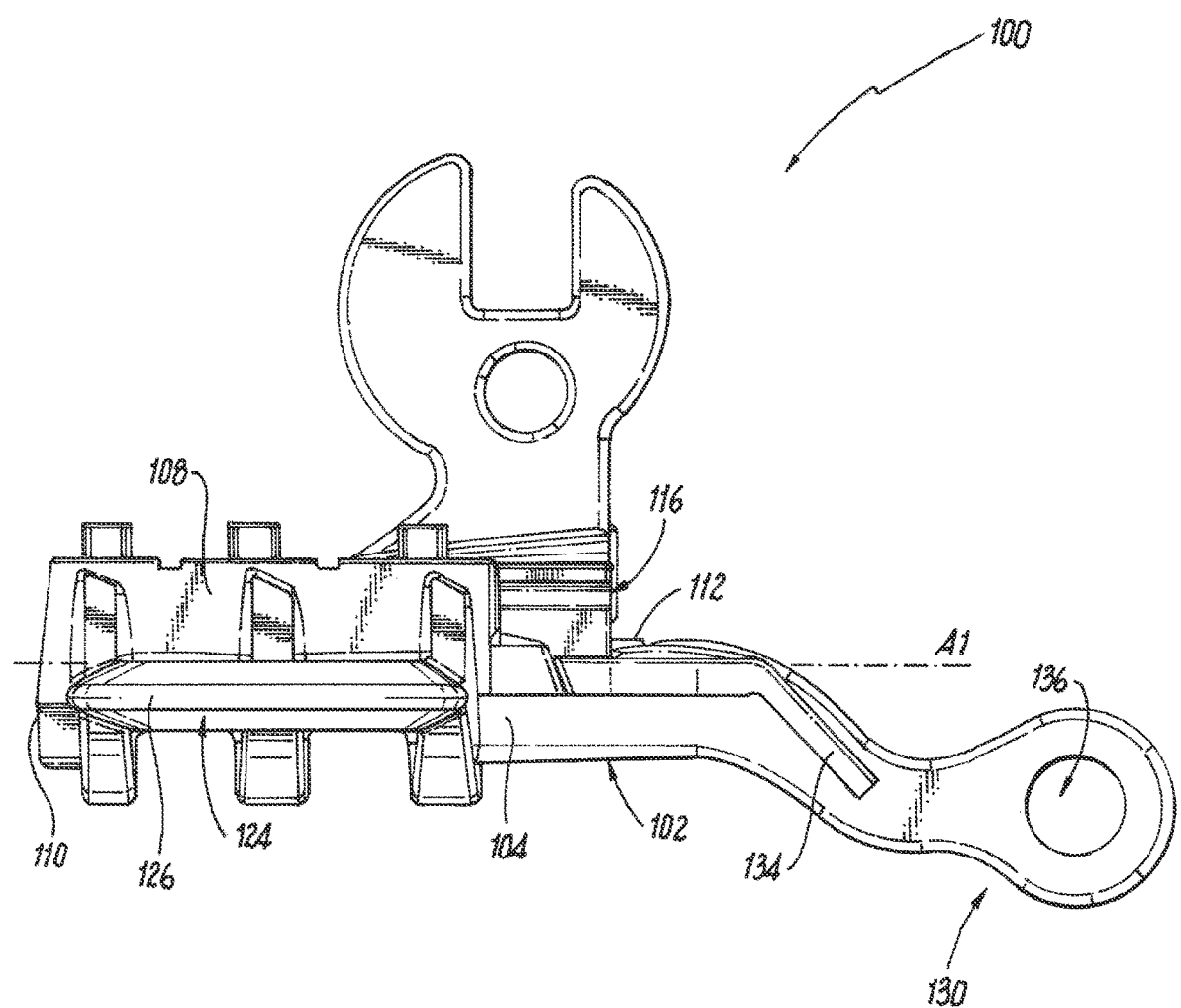
FIG. 3 is a side view of FIG. 1.
Figure 4:
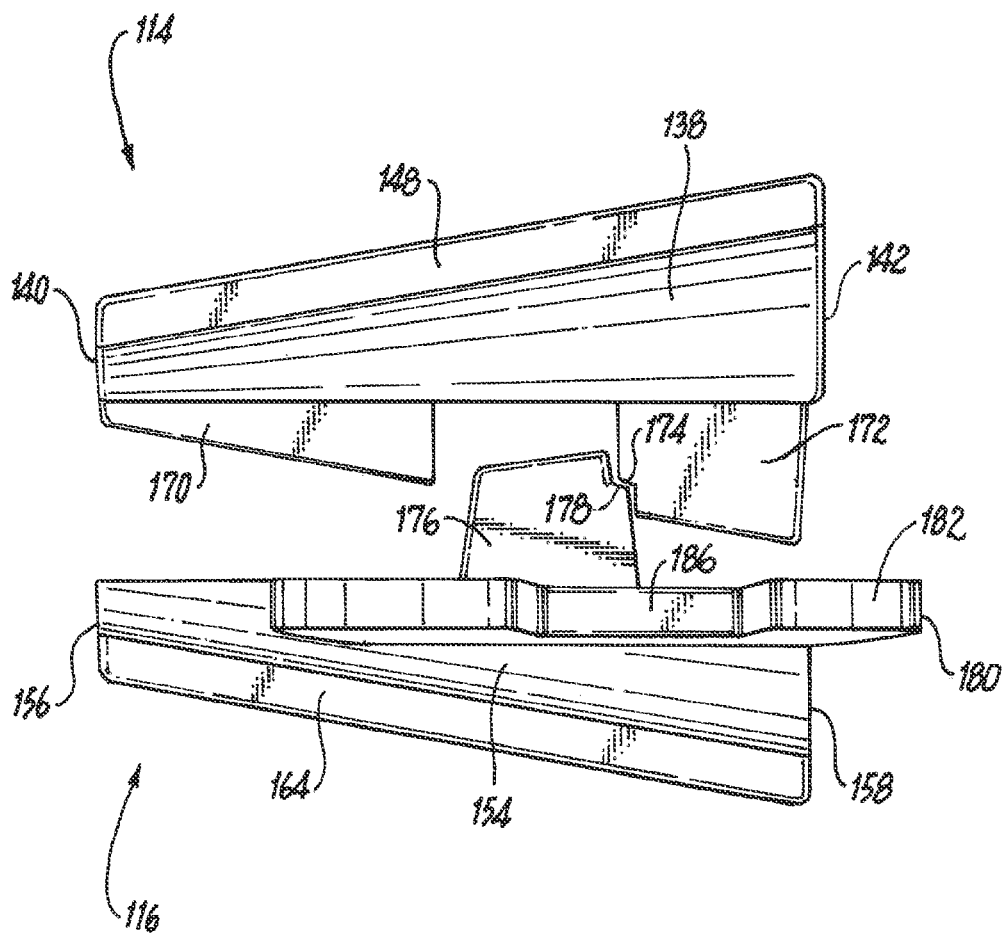
FIG. 4 is a top view of the first and second jaws.
Figure 5:
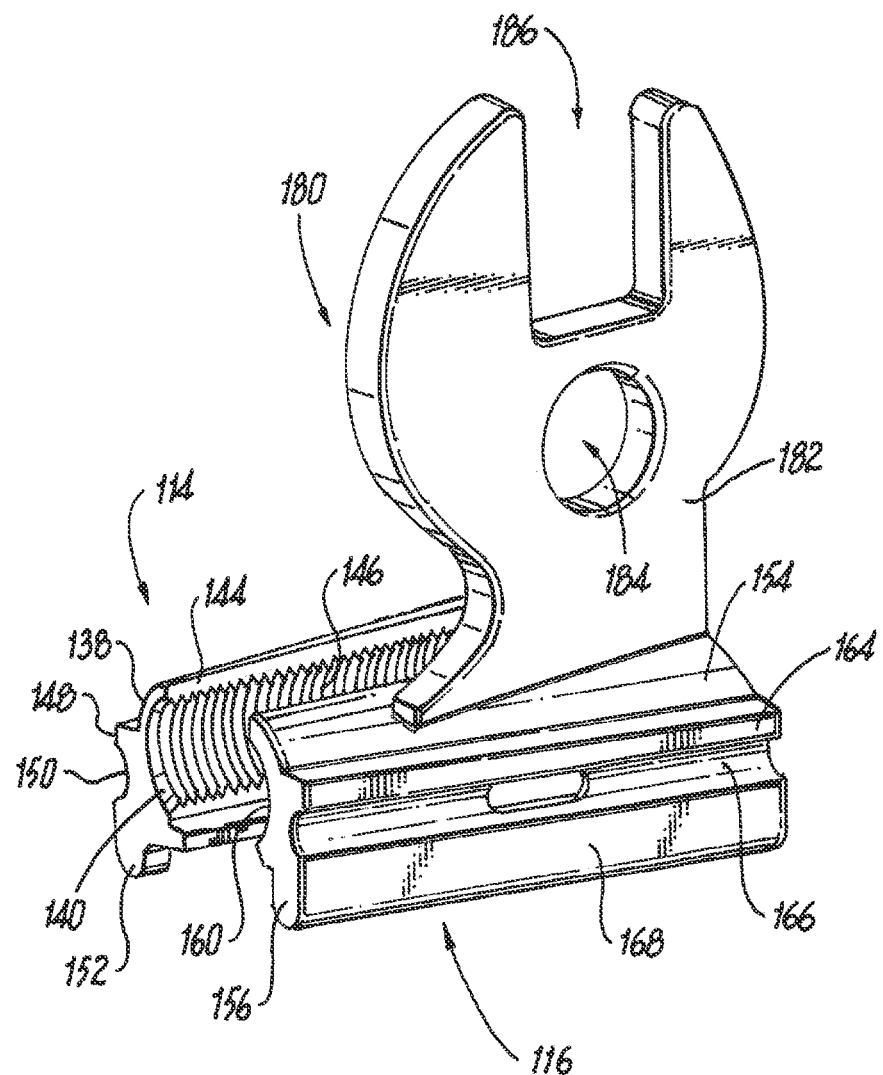
FIG. 5 is a perspective view of FIG. 4.
Figure 6:
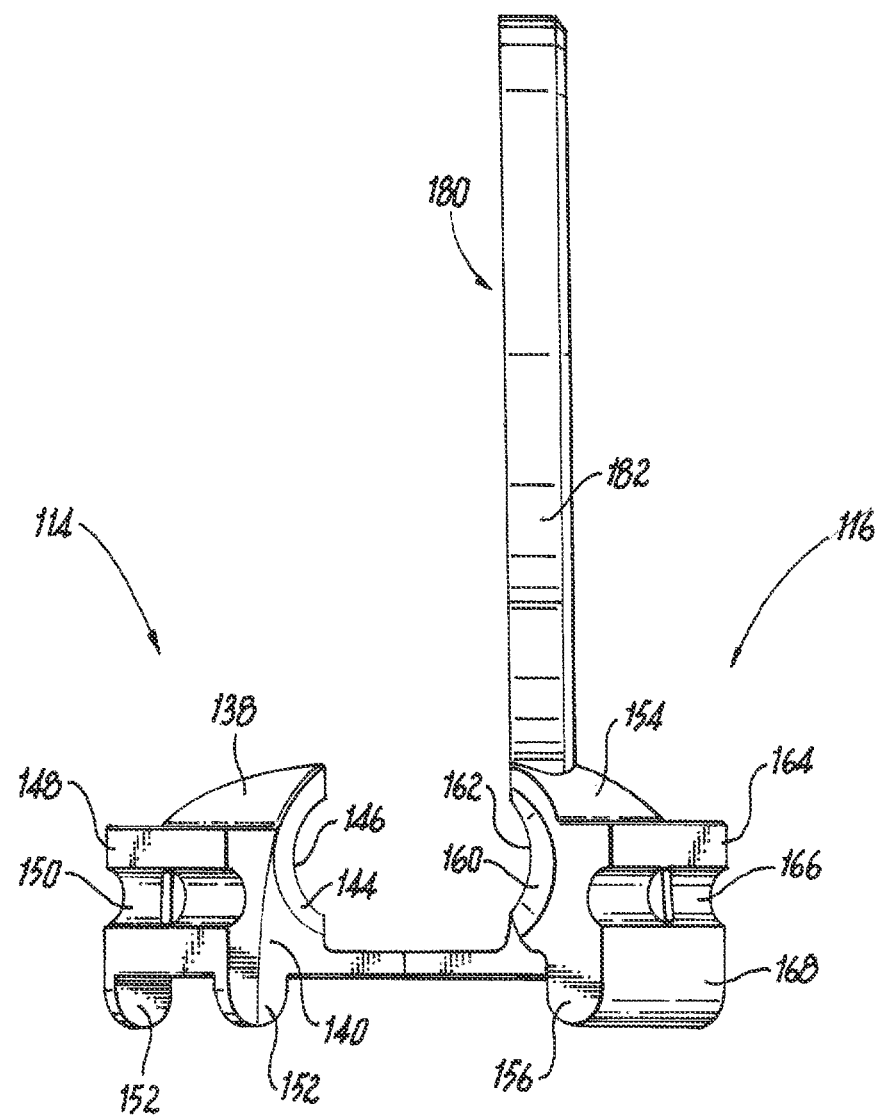
FIG. 6 is a front view of FIG. 4.

A wedge type, dead-end clamp assembly 100 includes a clamp body 102 having a base 104 from which a first jaw guide 106 and a second jaw guide 108 outwardly extend. The base 104 has a front end 110 and a rear end 112. The first and second jaw guides 106, 108 extend from the front end 110 to the rear end 112 of the clamp body 102. A first jaw 114 and a second jaw 116 are moveably positioned in the clamp body 102 adjacent the respective jaw guides 106, 108 for receiving a cable or conductor therebetween. A first groove 118 is provided in the clamp body 102 for receiving the first jaw 114. A second groove 120 is provided in the clamp body 102 for receiving the second jaw 116.

The jaws 114, 116 are movable between a rear position and a forward position on the clamp body 102. In certain aspects, the jaws 114, 116 are moved into the rear position to receive a cable and are moved into the forward position to engage and retain the cable in the dead-end clamp assembly 100. The jaws 114, 116 can engage the jaw guides 106, 108 and the grooves 118, 120 with sufficient friction to be retained in a desired place when set by a user. In other embodiments, one or more biasing members can be used to bias the first and second jaws into an engaged position. For example, a single biasing member (e.g., coil spring) is connected to the clamp body 102 and one of the jaws 114, 116 to pull or push the jaws 114, 116 toward the front end 110 of the clamp body 102. A first keeper 107 is removably connected to the first jaw guide 106 and a second keeper 109 is removably connected to the second jaw guide 108 to engage the respective jaws 114, 116 and prevent them from lifting out of the clamp body 102. The first and second keepers 107, 109 can include a series of slots that engage projections extending from the respective jaw guide 106, 108.

The first jaw guide 106 faces the second jaw guide 108 and forms a trough 122 therebetween. The trough 122 is substantially V-Shaped with the width of the trough 122 at the rear end 112 being larger than the width at the front end 110. The inner surfaces of the jaw guides 106,108 are angled inwardly from the rear end 112 to the front end 110 to cause the first and second jaws 114, 116 to move toward one another as the first and second jaws 114, 116 move through the trough 122 toward the front end 110 and away from each other as the jaws 114, 116 move toward rear end 112. The first and second grooves 118, 120 extend from the rear end 112 to the front end 110 of the clamp body 102. The trough 122 extends along a cable axis A1 for securing a cable, such as an electrical conductor or other utility line.

The dead-end clamp assembly 100 includes a sag eye 124 extending from the clamp body 102. The sag eye 124 includes a rim 126 surrounding an opening 128. The rim 126 extends from the side of the clamp body 102 away from the trough 122, with the opening 128 oriented perpendicular to the cable axis A1. The rim 126 can extend from at or near the front end 110 of the clamp body to at or near the rear end 112. One or more curvilinear and/or rectilinear walls make up the rim 126 and the opening 128 can have a substantially oval shape. In certain aspects, the rim 126 is configured so that the width of the opening 128 is larger in the front portion of the sag eye 124 than a rear portion. In other aspects, the size, shape and configuration of the rim 126 and opening 128 can be varied based on the environment of use and installation application.

The dead-end clamp assembly 100 also includes a clevis connector 130. The clevis connector includes a first leg 132 and a second leg 134 extending from the rear end 112 of the clamp body 102. The first and second legs 132, 134 each terminate in a cylindrical opening 136. The openings 136 are configured to receive a bolt or pin which can include a cotter opening. The clevis connector 130 is configured to receive a bracket or other fastening element to connect the dead-end clamp assembly 100 to a support. In certain embodiments, the legs 132, 134 are configured to extend below the clamp body 102 and the openings 136 are oriented below the cable axis A1 and perpendicular to the cable axis A1. The legs 132, 134 can be angled or curved to be positioned below the clamp body 102. For example, the legs 132, 134 can have a convex curve and a concave curve. Other configurations of a clevis connector may also be used. In certain aspects, the clamp body 102, sag eye 124, and clevis connector 130 are integrally formed. In other embodiments, one or more of these components can be formed separately and connected together by fasteners or a joining process (e.g., welding).

The first jaw 114 includes a first jaw body 138 having a front end 140 and a rear end 142. The first jaw body 138 tapers or narrows from the rear end 142 to the front end 140. The first jaw body 138 includes a curved inner surface 144. A plurality of teeth 146 are formed on the inner surface 144 and are configured to grip a cable. A ledge 148 extends from the first jaw body 138 opposite the inner surface 144. The ledge 148 is configured to slidably engage the first jaw guide 106. The ledge can include an outwardly facing channel 150. One or more legs 152 can extend downwardly from the first jaw body 138 to slidably engage the first groove 118 in the clamp body 102. For example, front and rear legs 152 can extend from the first jaw body 138, although a single leg, a continuous leg, or more than two legs can also be used. A biasing member can be positioned inside the legs 152 and engage one of the legs 152 and a stop located in the first groove 118 to bias the first jaw 114 into an engaged position.

The second jaw 116 includes a second jaw body 154 having a front end 156 and a rear end 158. The second jaw body 154 tapers or narrows from the rear end 158 to the front end 156. The second jaw body 154 includes a curved inner surface 160. A plurality of teeth 162 are formed on the inner surface 160 and are configured to grip a cable. A ledge 164 extends from the second jaw body 154 opposite the inner surface 160. The ledge 164 is configured to slidably engage the second jaw guide 108. The ledge 165 can include an outwardly facing channel 166. One or more legs 168 can extend downwardly from the second jaw body 154 to slidably engage the second groove 120 in the clamp body 102. For example, a single continuous leg 168 can extend from the first jaw body, although a single leg, or multiple legs can also be used.

A first tab 170 and a second tab 172 extend outwardly from the inner surface 144 of the first jaw body 138, and are configured to extend into the trough 122. The first and second tabs 170, 172 can be tapered, for example at the same angle as the first jaw body 138. A slot is formed between the first and second tab 170, 172. One of the tabs 170, 172 includes a mating feature to assist engagement with the second jaw 116. For example, the second tab 172 can include an L-shaped notch 174.

A third tab 176 extends outwardly from the inner surface 160 of the second jaw body 154, and is configured to extend into the trough 122. The third tab 176 can be tapered, for example at the same angle as the second jaw body 154. The third tab 176 is configured to mate with the slot between the first and second tabs 170, 172. The third tab 176 can also include a mating feature to assist engagement with the first jaw 114. For example, the third tab 176 can include an L-shaped notch 178 that mates with the L-shaped notch 174 on the second tab 172. Engagement of the third tab 176 with the first tab 170 or second tab 172 keys the first jaw 114 and the second jaw 116 together so that they can slide forward and backward in the clamp body 102 as a single unit. Engagement of the notches 174, 178 enables a user to secure the jaws 114, 116 in an open position.

In some embodiments, a pullback interface 180 extends upward from the second jaw body 154 and is configured to project above the clamp body 102. The pullback interface 180 includes an interface body 182 having one or more openings. In certain embodiments the interface body 182 includes a rounded projection and the openings include a circular aperture 184 and rectilinear slot 186 formed in the projection. The opening can be configured to allow a user to engage the pullback interface 180 by hand or with a hot stick or other tool. Other sizes, shapes, and configurations for the interface body and openings may be used.

During an emergency situation that involves a downed utility line (e.g., a power line) there is typically no way for a first responder, acting alone, to cut a section of a downed line without the remaining sections also falling onto the ground. This is because the portion of the conductor that is still in the air would slip out of the insulator. Accordingly, a downed conductor must be tagged and then later cut and replaced by a line crew. This process can take an extended period of time, meanwhile the downed conductor can pose a problem to emergency personnel.

The dead-end clamp assembly 100 is designed to alleviate these problems by allowing a single person (such as a first responder) to position and attach the dead-end clamp assembly 100 to secure a portion of a conductor. The dead-end clamp assembly 100 is able to be attached by a single person using a hotstick while the line is energized, allowing for a safer installation process. A single hotstick can be used during installation without requiring disengagement of the hotstick from the dead-end clamp assembly 100. When being held by the hotstick and installed, the legs 132, 134 of the clevis 130 are positioned so that they will not come into contact with the live line or interfere in the installation process. There is also no need to contact or shape any part of the conductor prior to the installation process.

Figure 7:
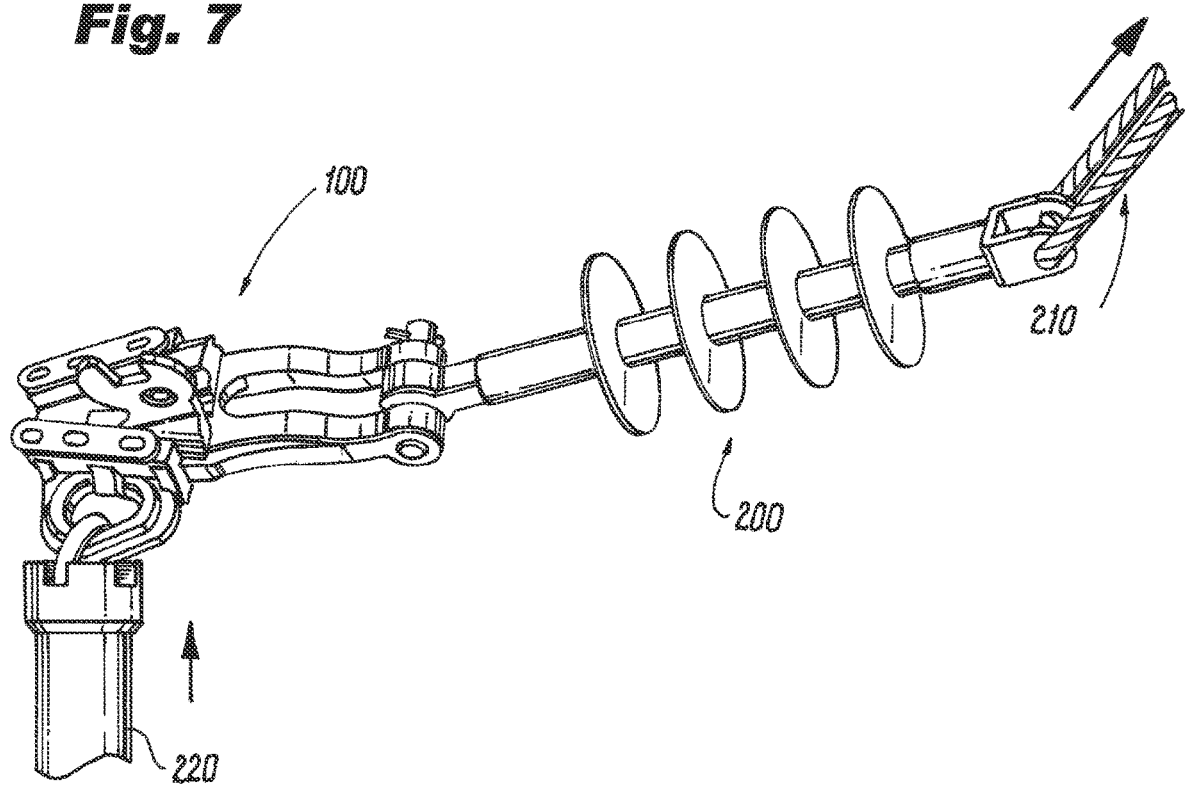
FIG. 7 shows an installation process for the clamp of FIG. 1.
Figure 8:
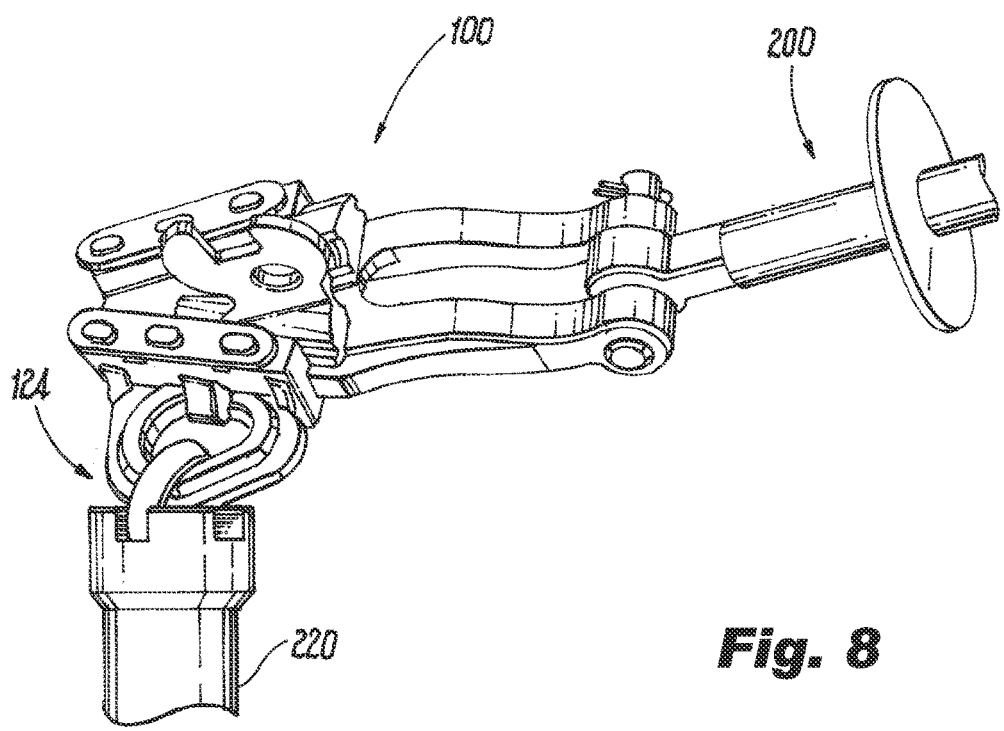
FIG. 8 shows an installation process for the clamp of FIG. 1.
Figure 9:
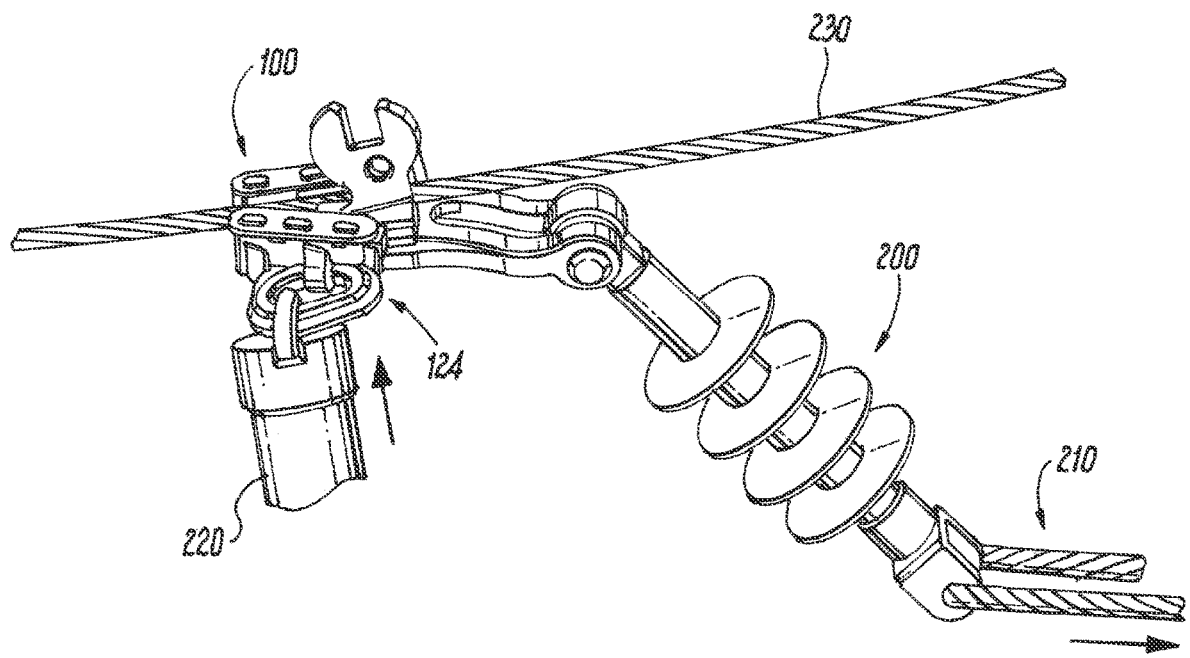
FIG. 9 shows an installation process for the clamp of FIG. 1.
Figure 10:
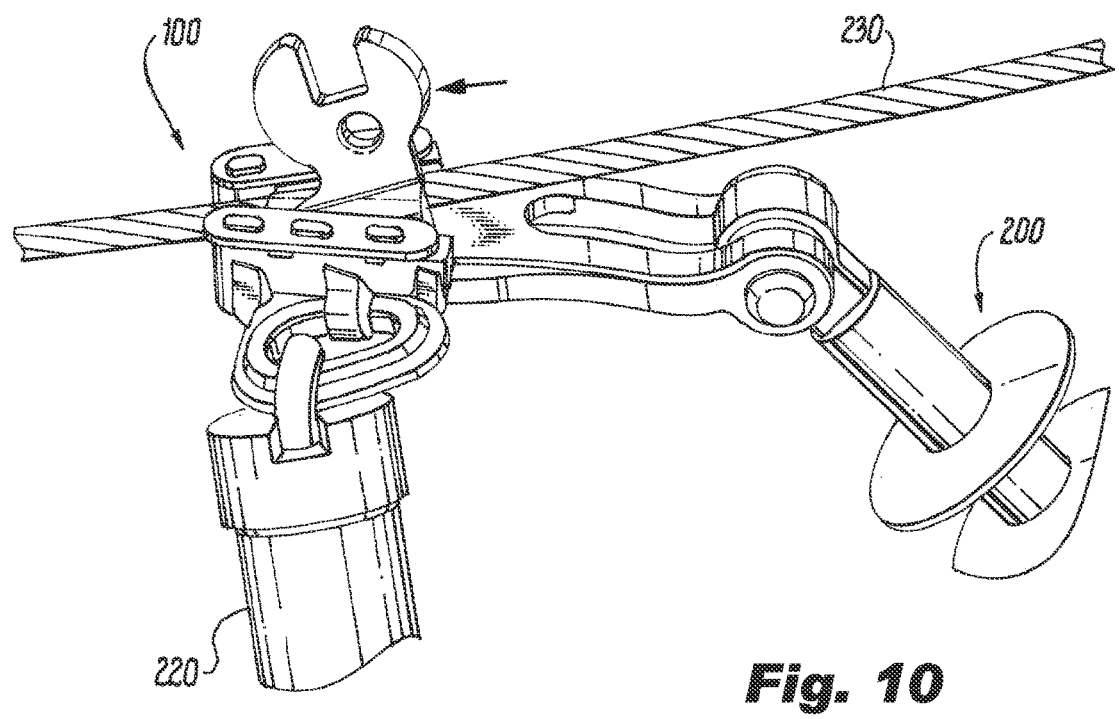
FIG. 10 shows an installation process for the clamp of FIG. 1.

FIGS. 7-10 show an exemplary installation process of the dead-end clamp assembly 100. The dead-end clamp assembly 100 is positioned in a location for use, such as at an emergency situation near a downed power wire or at other utility line locations where the dead-end clamp assembly 100 is needed. An insulator 200 is connected to the dead-end clamp assembly 100 through the clevis connector 130. The insulator 200 can be tied to a support, such as a utility pole cross arm, using a rope or cable 210. The jaws 114, 116 of the dead-end clamp assembly 100 are placed in a retracted position. The jaws 114, 116 are configured to remain in place in the retracted position through a friction engagement without additionally input from a user. This friction engagement can be, in part, through the engagement of the legs 152, 156 and the grooves 118 and 120. A hotstick 220 is connected to the sag eye 124. The dead-end clamp assembly 100 can then be hoisted until it is positioned near a conductor 230 using the rope 210, hotstick 220, or a combination thereof.

Using the hotstick 220, the dead-end clamp assembly 100 is positioned so that conductor 230 is positioned in the jaws 114, 116. The hotstick 220 is then used to manipulate the dead-end clamp assembly 100 so that the jaws 114, 116 move forward and engage the conductor 230. A certain amount or type of movement in the dead-end clamp assembly 100 can dislodge the friction engagement of one or both jaws 114, 116. In some operations, the user can pull down and back on the hotstick 220, engaging at least one of the jaws 114, 116 with the conductor 230 and causing the jaws 114, 116 to move toward the front end 110 of the clamp body 102. In some operations, the user can shake or jerk the clamp body 102 to dislodge the jaws 114, 116 and activate the biasing member that pulls the jaws 114, 116 forward. Once the dead-end clamp assembly 100 is engaged, a user can cut a section of the conductor 230 that is downed to remove the energized conductor on the ground. The dead-end clamp assembly 100 will support the remaining section of the conductor 230 so that is does not disengage from the utility line support assembly.

As shown, the dead-end clamp assembly 100 can be installed entirely using a single hotstick without other engagement of a user with the clamp body 102 or the first and second jaws 114, 116. Certain aspects of the installation procedure can be performed in various orders.

The legs 132, 134 of the clevis connector 130 position the attachment to the insulator 200 below the conductor 230 so that the insulator is not in the way of the conductor 230 or of the attachment to the conductor 230. Additionally, the position of the sag eye 124 allows a user to position the dead-end clamp assembly 100 to engage the conductor 230 using a single hotstick 220.

Figure 11:
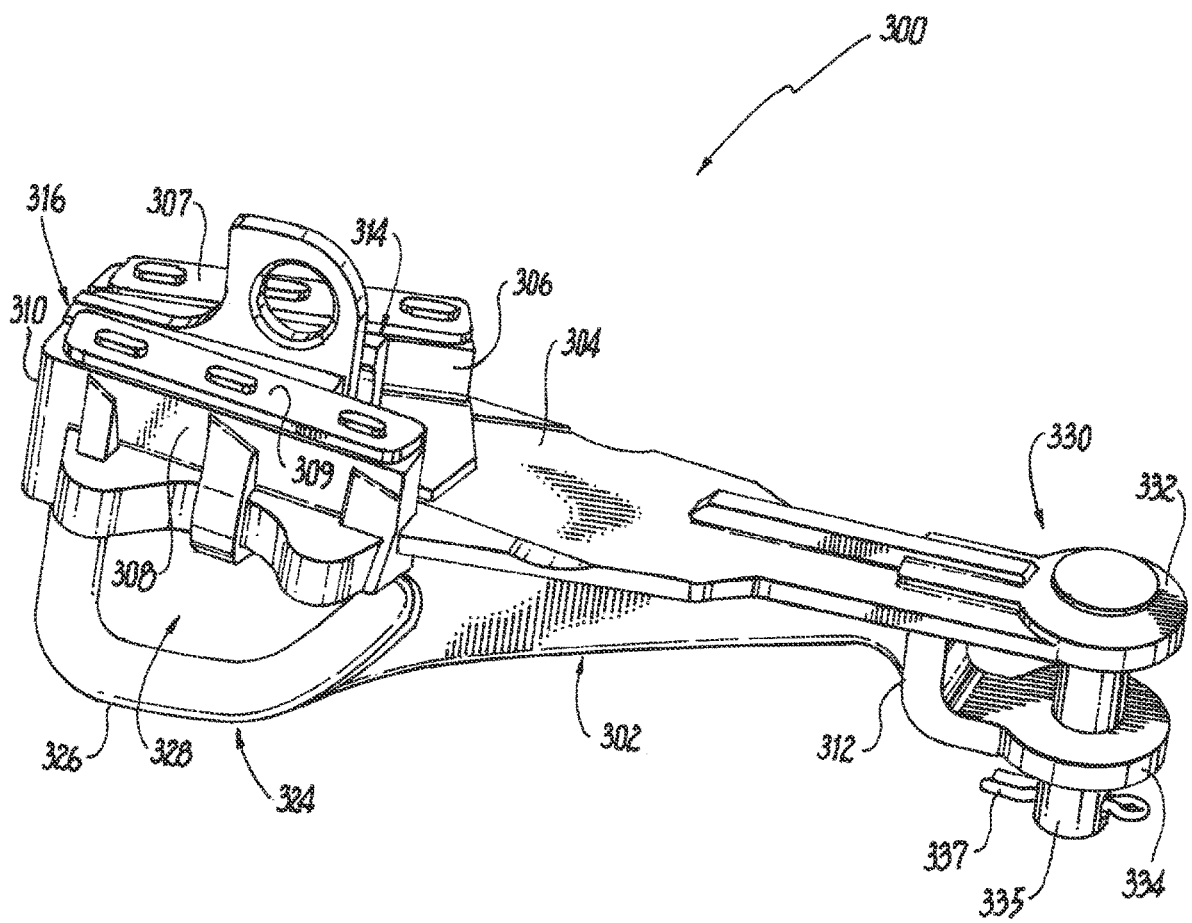
FIG. 11 is a perspective view of an exemplary clamp assembly.
Figure 12:
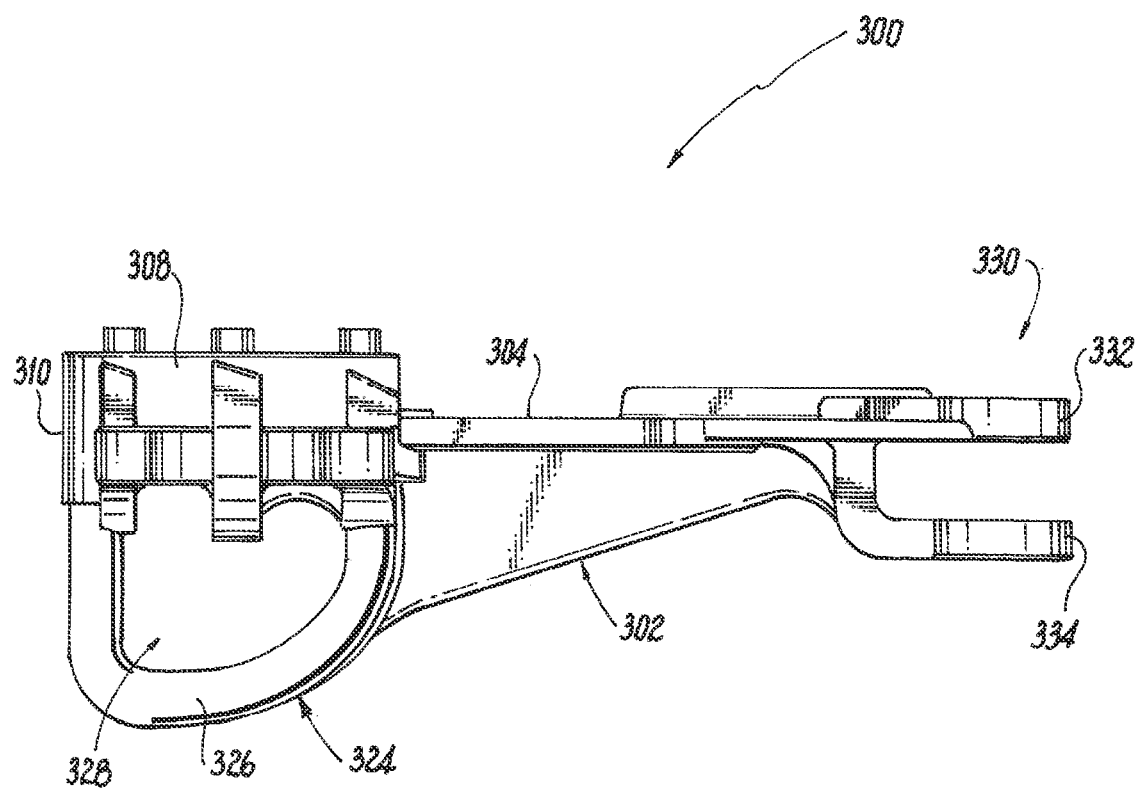
FIG. 12 is side view of the clamp body of FIG. 11.
Figure 13:
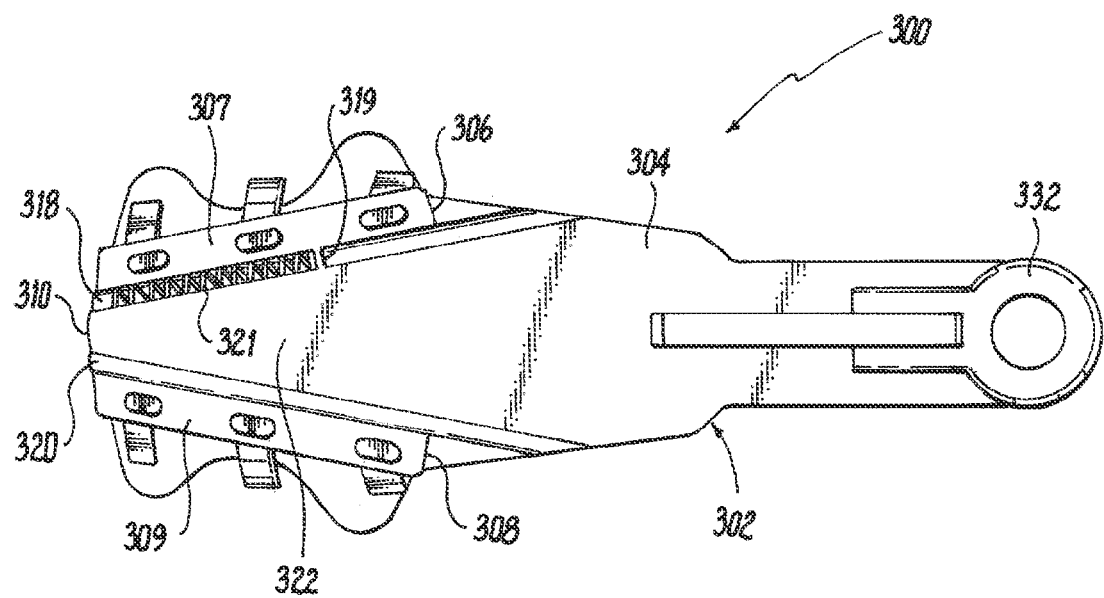
FIG. 13 is a top view of the clamp body of FIG. 11.
Figure 14:
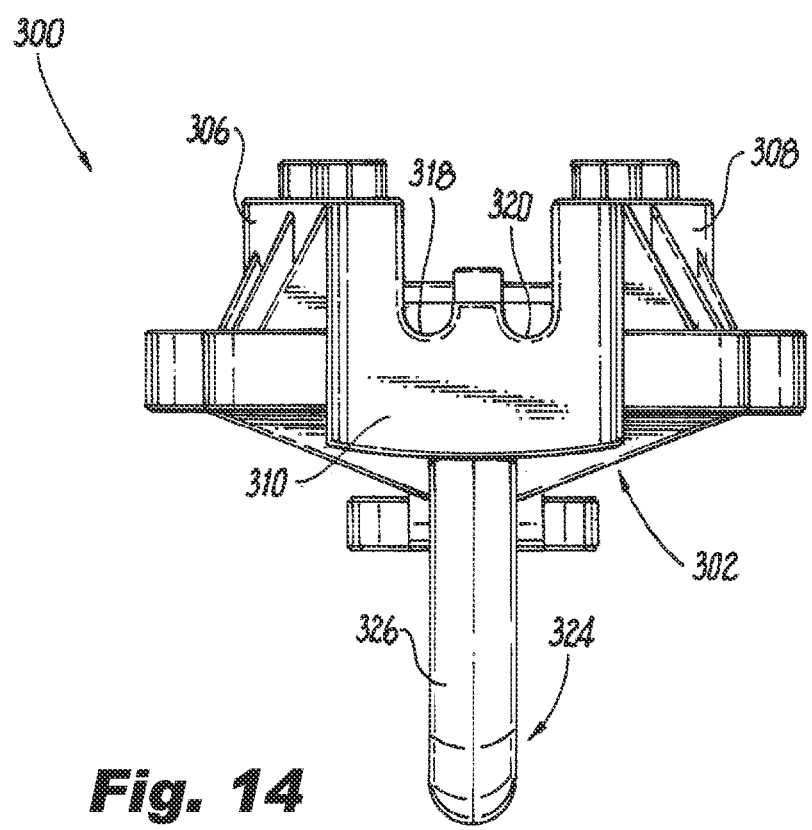
FIG. 14 is a front view of the clamp body of FIG. 11.
Figure 15:
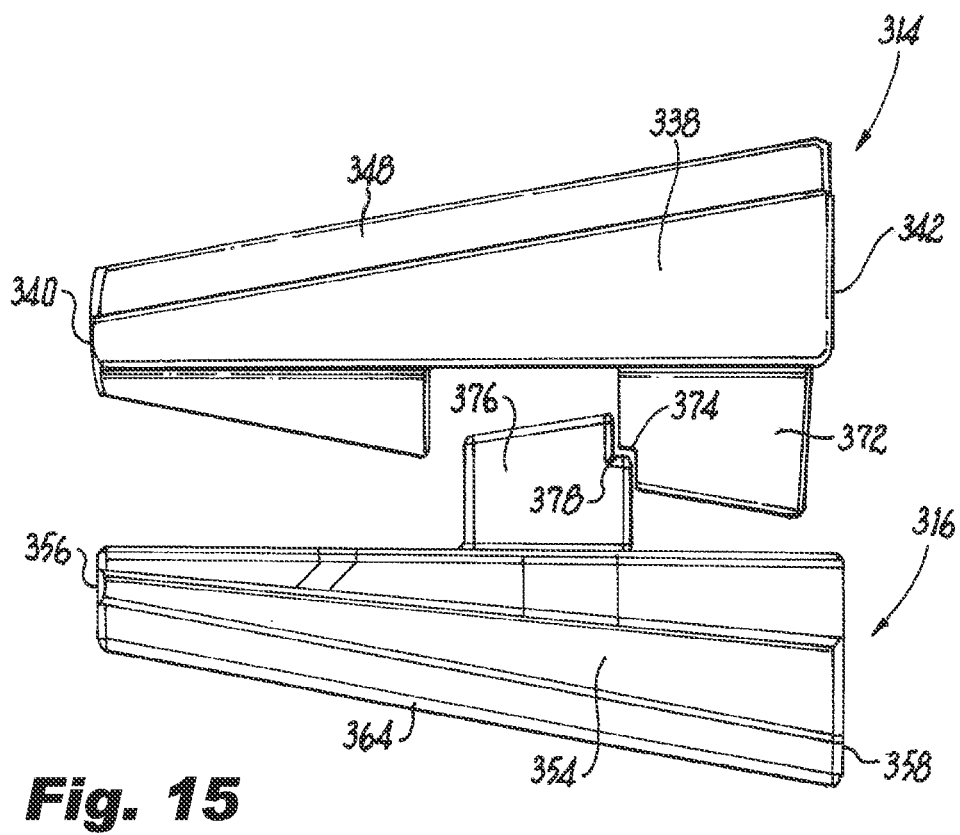
FIG. 15 is a top view of the jaws of FIG. 11.
Figure 16:
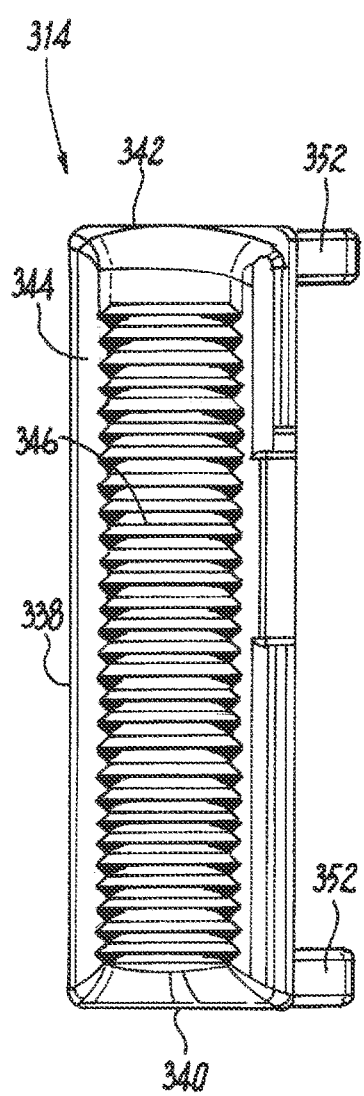
FIG. 16 is a side view of the first jaw of FIG. 11.
Figure 17:
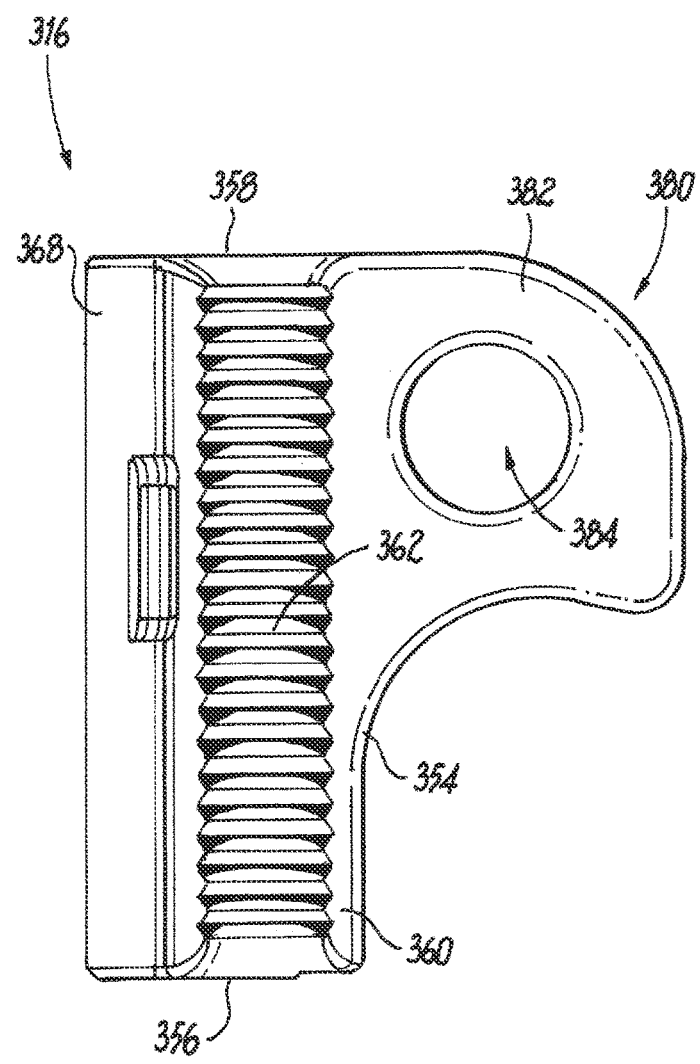
FIG. 17 is a side view of the second jaw of FIG. 11.

FIGS. 11-16 show another exemplary embodiment of a wedge type, dead-end clamp assembly 300 that can be installed as described above. The dead-end clamp assembly 300 includes a clamp body 302 having a base 304. A first jaw guide 306 and a second jaw guide 308 extend outwardly from the clamp body 302. The base 304 has a front end 310 and a rear end 312. The first and second jaw guides 306, 308 extend from the front end 310 to the rear end 312 of the clamp body 302. A first jaw 314 and a second jaw 316 are moveably positioned in the clamp body 302 adjacent the respective jaw guides 306, 308 for receiving a cable or conductor therebetween. A first groove 318 is provided in the clamp body 302 for receiving the first jaw 314. A second groove 320 is provided in the clamp body 302 for receiving the second jaw 316.

The jaws 314, 316 are movable between a rear position and a forward position on the clamp body 302. In certain aspects, the jaws 314, 316 are moved into the rear position to receive a cable and are moved into the forward position to engage and retain the cable in the dead-end clamp assembly 300. In certain embodiments, the jaws 314, 316 engage the jaw guides 306, 308 and the grooves 318, 320 with sufficient friction to be retained in a desired place when set by a user. In certain embodiments, one or more biasing members 321 can be used to bias the first and second jaws into an engaged position. For example, a single biasing member 321 (e.g., coil spring) is connected to the clamp body 302 and one of the jaws 314, 316 to pull or push the jaws 314, 316 toward the front end 310 of the clamp body 302. The biasing member 321 can be connected at one end to a stop 319 positioned in the first groove 318 and at a second end to one of the jaws 314.

A first keeper 307 is removably connected to the first jaw guide 306 and a second keeper 309 is removably connected to the second jaw guide 308 to engage the respective jaws 314, 316 and prevent them from lifting out of the clamp body 302. The first and second keepers 307, 309 can include a series of slots that engage projections extending from the respective jaw guide 306, 308.

The first jaw guide 306 faces the second jaw guide 308 and forms a trough 322 therebetween. The trough 322 is substantially V-Shaped with the width of the trough 322 at the rear end 312 being larger than the width at the front end 310. The inner surfaces of the jaw guides 306, 308 are angled inwardly from the rear end 312 to the front end 310 to cause the first and second jaws 314, 316 to move toward one another as the first and second jaws 314, 316 move through the trough 322 toward the front end 310 and away from each other as the jaws 314, 316 move toward the rear end 312. The first and second grooves 318, 320 extend from the rear end 312 to the front end 310 of the clamp body 302. The trough 322 extends along a cable axis A1 for securing a cable, such as an electrical conductor or other utility line.

The dead-end clamp assembly 300 includes a sag eye 324 extending from the clamp body 302. The sag eye 324 includes a rim 326 surrounding an opening 328. The rim 326 extends from the bottom clamp body 302 away from the trough 322, with the opening 328 oriented perpendicular to the cable axis A1. The rim 326 can extend from at or near the front end 310 of the clamp body to at or near the rear end 312. One or more curvilinear and/or rectilinear walls make up the rim 326 and the opening 328 can have a substantially D-shape. In certain aspects, the rim 326 is configured so that the width of the opening 328 is larger in the front portion of the sag eye 324 than a rear portion. In other aspects, the size, shape and configuration of the rim 326 and opening 328 can be varied based on the environment of use and installation application.

The dead-end clamp assembly 300 also includes a clevis connector 330. The clevis connector includes a first leg 332 and a second leg 334 extending from the rear end 312 of the clamp body 302. The first and second legs 332, 334 each terminate in a cylindrical opening 136. The openings 136 are configured to receive a bolt or pin 335 which can include a cotter opening to receive a cotter pin 337. The clevis connector 330 is configured to receive a bracket or other fastening element to connect the dead-end clamp assembly 300 to a support. Other configurations of a clevis connector may also be used. In certain aspects, the clamp body 302, sag eye 324, and clevis connector 330 are unitarily formed. In other embodiments, one or more of these components can be formed separately and connected together by fasteners or a joining process (e.g., welding).

The first jaw 314 includes a first jaw body 338 having a front end 340 and a rear end 342. The first jaw body 338 tapers or narrows from the rear end 342 to the front end 340. The first jaw body 338 includes a curved inner surface 344. A plurality of teeth 346 are formed on the inner surface 344 and are configured to grip a cable. A ledge 348 extends from the first jaw body 338 opposite the inner surface 344. The ledge 348 is configured to slidably engage the first jaw guide 306. The ledge can include an outwardly facing channel 350. One or more legs 352 can extend downwardly from the first jaw body 338 to slidably engage the first groove 318 in the clamp body 302. For example, front and rear legs 352 can extend from the first jaw body 338, although a single leg, a continuous leg, or more than two legs can also be used. The front and rear legs 352 can be positioned in the separate parts of the first groove 318 on opposite sides of the stop 319. The biasing member 321 can be connected to the stop 319 and to either the front or rear leg 352 (depending on the type of biasing member) to bias the jaws 114, 116 to a closed position.

The second jaw 316 includes a second jaw body 354 having a front end 356 and a rear end 358. The second jaw body 354 tapers or narrows from the rear end 358 to the front end 356. The second jaw body 354 includes a curved inner surface 360. A plurality of teeth 362 are formed on the inner surface 360 and are configured to grip a cable. A ledge 364 extends from the second jaw body 354 opposite the inner surface 360. The ledge 364 is configured to slidably engage the second jaw guide 308. The ledge 365 can include an outwardly facing channel 366. One or more legs 368 can extend downwardly from the second jaw body 354 to slidably engage the second groove 320 in the clamp body 302. For example, a single continuous leg 368 can extend from the first jaw body, although a single leg, or multiple legs can also be used.

A first tab 370 and a second tab 372 extend outwardly from the inner surface 344 of the first jaw body 338, and are configured to extend into the trough 322. The first and second tabs 370, 372 can be tapered, for example at the same angle as the first jaw body 338. A slot is formed between the first and second tab 370, 372. One of the tabs 370, 372 includes a mating feature to assist engagement with the second jaw 316. For example, the second tab 372 can include an L-shaped notch 374.

A third tab 376 extends outwardly from the inner surface 360 of the second jaw body 354, and is configured to extend into the trough 322. The third tab 376 can be tapered, for example at the same angle as the second jaw body 354. The third tab 376 is configured to mate with the slot between the first and second tabs 370, 372. The third tab 376 can also include a mating feature to assist engagement with the first jaw 314. For example, the third tab 376 can include an L-shaped notch 378 that mates with the L-shaped notch 374 on the second tab 372. Engagement of the third tab 376 with the first tab 370 or second tab 372 keys the first jaw 314 and the second jaw 316 together so that they can slide forward and backward in the clamp body 302 as a single unit.

In some embodiments, a pullback interface 380 extends upward from the second jaw body 354 and is configured to project above the clamp body 302. The pullback interface 380 includes an interface body 382 having one or more openings. In certain embodiments the body includes a rounded projection and the opening includes a circular aperture 384. The opening can be configured to allow a user to engage the pullback interface 380 by hand or with a hot stick. Other sizes, shapes, and configurations for the interface body and openings may be used.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A dead-end clamp assembly for a utility conductor, comprising:
   a clamp body including a base having a front end and a rear end, a first jaw guide extending from the base, and a second jaw guide extending from the base, wherein the base, first jaw guide, and second jaw guide at least partially define a trough and the trough at least partially defines a conductor axis;
   a first jaw movably engaging the body and a second jaw movably engaging the body, the first jaw engaging the second jaw such that the first and second jaws move together;
   a sag eye extending from the clamp body, the sag eye having an opening configured to receive a hotstick; and
   a clevis connector extending from the rear end of the clamp body, the clevis connector configured to receive a clevis pin so that the clevis pin and a connected insulator are positioned entirely below the conductor axis when the base and the trough are positioned below the conductor relative to a ground surface.

2. The clamp assembly of claim 1, wherein the sag eye opening is oriented orthogonal to the conductor axis.

3. The clamp assembly of claim 1, wherein the clamp body, sag eye, and clevis connector are integrally formed.

4. The clamp assembly of claim 1, wherein a first groove and a second groove are formed in the base, and wherein the first groove slidably receives the first jaw and the second groove slidably receives the second jaw.

5. The clamp assembly of claim 1, wherein the clevis connector includes a first leg and a second leg extending downwardly from the base, the first leg having a first concave section and the second leg having a second concave section.

6. The clamp assembly of claim 1, wherein the sag eye opening is oriented to allow a hotstick to be positioned to a side of the clamp body.

7. The clamp assembly of claim 1, wherein the first jaw includes a first tab and a second tab, the first and second tabs spaced from each other to define a slot, and wherein the second jaw includes third tab, the third tab configured to be received in the slot when the first jaw and the second jaw are assembled with the clamp body.

8. The clamp assembly of claim 7, wherein the second tab includes a first notch and the third tab includes a second notch configured to mate with the first notch.

9. The clamp assembly of claim 1, wherein the second jaw includes a pullback interface.

10. The clamp assembly of claim 9, wherein the pullback interface includes a projection, an aperture formed in the projection, and a slot formed in the projection.

11. A dead-end clamp assembly for a utility conductor, comprising:
a clamp body including a base having a front end and a rear end, a first jaw guide extending from the base, and a second jaw guide extending from the base, wherein the base, first jaw guide, and second jaw guide at least partially define a trough and the trough at least partially defines a conductor axis;
a first jaw movably engaging the body and a second jaw movably engaging the body, the first jaw engaging the second jaw such that the first and second jaws move together;
a sag eye extending from the clamp body beneath the base opposite the trough, the sag eye having an opening configured to receive a hotstick and oriented to allow a connected hotstick to be positioned beneath the base;
and a clevis connector extending from the rear end of the clamp body, wherein the clevis connector includes a first leg and a second leg spaced from one another by a gap, and wherein the gap is positioned entirely below the conductor axis at a distance to receive a clevis pin and a connected insulator entirely below the conductor axis when the base and the trough are positioned below the conductor relative to a ground surface.

12. The clamp assembly of claim 11, wherein the sag eye opening is oriented orthogonal to the conductor axis.

13. The clamp assembly of claim 11, wherein a first groove and a second groove are formed in the base, and wherein the first groove slidably receives the first jaw and the second groove slidably receives the second jaw.

14. The clamp assembly of claim 11, further comprising a clevis pin positioned in the clevis connector.

15. The clamp assembly of claim 11, wherein the first jaw includes a first tab and a second tab, the first and second tabs spaced from each other to define a slot, and wherein the second jaw includes third tab, the third tab configured to be received in the slot when the first jaw and the second jaw are assembled with the clamp body.

16. The clamp assembly of claim 15, wherein the second tab includes a first notch and the third tab includes a second notch configured to mate with the first notch.

17. The clamp assembly of claim 11, wherein the second jaw includes a pullback interface.

18. The clamp assembly of claim 17, wherein the pullback interface includes a projection, an aperture formed in the projection, and a slot formed in the projection.

19. A method of installing a dead-end clamp assembly on a utility conductor comprising:
positioning a clamp assembly including a clamp body, a first jaw, a second jaw, a sag eye, and a clevis connector, wherein the clamp body between the first jaw and the second jaw defines a trough for receiving a conductor;
connecting a hotstick to the sag eye;
moving the clamp assembly, with the hotstick, to receive the conductor; and
engaging the first jaw and second jaw with the conductor,
wherein moving the clamp assembly to receive the conductor and engaging the first jaw and second jaw are performed using a single hotstick without requiring disengagement of the hotstick from the sag eye,
wherein the clamp assembly includes a conductor axis and the clevis connector is configured to receive a clevis pin so that the clevis pin and a connected insulator are positioned entirely below the conductor axis when the trough is positioned below the conductor relative to a ground surface.

20. The method of claim 19, wherein the sag eye extends from the clamp body substantially orthogonal to the conductor.

21. The method of claim 19, further comprising attaching an insulator to the clamp assembly through the clevis connector.

22. The method of claim 19, further comprising attaching a rope to the insulator and raising the clamp assembly to the conductor using the rope.

\* \* \* \* \*